Jan. 1, 1963 K. E. SCHREINER 3,071,738

INFORMATION-HANDLING APPARATUS AND METHOD

Filed June 18, 1958 3 Sheets-Sheet 1

FIG. 1

| SYSTEMS WITH 2 VARIABLE INPUTS | | | | |
|---|---|---|---|---|
| | NUMBER OF POSITIVE INPUTS | | | LOGICAL OPERATION PERFORMED |
| | 0 | 1 | 2 | |
| PHASE OF OUTPUT | − | + | + | OR |
| | − | − | + | AND |
| | − | + | − | EXCLUSIVE OR |

FIG. 2

| SYSTEMS WITH 3 VARIABLE INPUTS | | | | | | |
|---|---|---|---|---|---|---|
| | NUMBER OF POSITIVE INPUTS | | | | LOGICAL OPERATION PERFORMED | LINE |
| | 0 | 1 | 2 | 3 | | |
| PHASE OF OUTPUT | − | + | + | + | OR (1, 2, OR ALL 3) | 1 |
| | − | − | + | + | MAJORITY (2 OR 3 OUT OF 3) | 2 |
| | − | + | − | + | BINARY SUM (1 ONLY OR ALL 3) | 3 |
| | − | + | + | − | 1 OR 2 ONLY, OUT OF 3 | 4 |
| | − | − | − | + | AND (ALL 3) | 5 |
| | − | − | + | − | 2 ONLY, OUT OF 3 | 6 |
| | − | + | − | − | EXCLUSIVE OR (1 ONLY, OUT OF 3) | 7 |

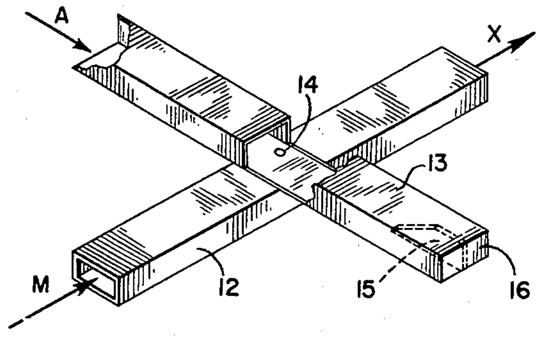

FIG. 3

INFORMATION-HANDLING APPARATUS AND METHOD

Filed June 18, 1958 3 Sheets-Sheet 3

3,071,738

INFORMATION-HANDLING APPARATUS AND METHOD

Kenneth E. Schreiner, Harrington Park, N.J., assignor to International Business Machines Corporation, New York, N.Y., a corporation of New York Filed June 18, 1958, Ser. No. 742,866
13 Claims. (Cl. 333—11)

This invention relates to information-handling, and more particularly to apparatus and methods for combining information in accordance with given rules of combination, as for example, in performing logical operations.

The present application is a continuation-in-part of the joint application of this applicant and B. L. Havens, Serial No. 715,353, filed February 14, 1958, now Patent No. 2,987,253. The present application discloses and claims certain subject matter disclosed but not specifically claimed in said joint application.

The invention relates more particularly to systems in which the organization is favorable to the use of phase-modulated waves to represent information. The information thus represented may be of a wide variety of types, including, for example, digits, sensed quantities, commands, logical operations, control information, or other forms of intelligence.

Thus, for example, in a computer, the binary digit "one" may be represented by a wave of one phase with respect to a fixed phase standard and the binary digit "zero" may be represented by a wave the phase of which is materially different from that of the first mentioned wave, the phase difference preferably being substantially 180 degrees.

A feature of the invention is the adaptability of the system to the use of electromagnetic waves of very high, or ultra-frequencies, commonly called microwaves, of, for example, ten kilomegacycles per second or more, although the invention may also be used at other frequencies.

An object of the invention is to increase the speed of operation of an information-handling system.

The invention is adaptable to the use of microwave elements such as "magic-T" waveguide junctions, balanced diode detectors and modulators, coaxial transmission lines, hollow metal waveguides, traveling wave tube devices, etc., which can be used for very high speed transmission of signals. For example, if ten cycles of an alternating wave are required to transmit one bit of information, for example, one binary digit, the bit interval required to transmit intelligence by means of a ten kilomegacycle wave is only one millimicrosecond.

The use of phase-modulated waves of a reliable type in the systems described herein makes it possible to represent different bits of information by waves of substantial and closely equal amplitude, thereby reducing the effects of noise and other interfering waves.

In certain illustrative forms of the invention, there are provided systems for combining information from various sources according to given rules of combination to perform certain logical operations. The information from the sources is first translated into a plurality of phase-modulated waves, distinguishable from one another as to phase. Means are provided for sensing the phases of these phase-modulated waves and for controlling the phase of a phase-modulated output wave in accordance with the result of the sensing operation, to indicate by the phase of the output wave the result of combining the information from the sources in accordance with the given rule.

A feature of the invention is the use of waveguide junctions, directional couplers, etc., which provide substantially uniform loading conditions for the sources of a plurality of input waves regardless of changes in the phases of the various input waves. This uniformity is provided by making use of the phase sensitive properties of such devices to effect a transfer of power from one waveguide arm to another under different combinations of input phases, thus avoiding the need for reflection of power at open circuit or short circuit locations in the system.

Two or more waves, for example phase-modulated, may be combined in a single stage device to perform a given logical operation.

However, there are certain advantages to embodiments in which the combination of a plurality of waves are carried out while combining only even numbers of waves, and generally preferably just two waves in any given single stage device, thus utilizing to advantage the phase sensitive qualities and phase determinative properties of certain high frequency transmission devices such as directional couplers and waveguide junctions in particular, to avoid the undesirable reaction of changing load conditions upon the sources of the waves to be combined.

One scheme is to combine two waves in one device and combine the result with a third wave in a second device.

Another scheme is to combine a first pair of waves in one device, a second pair of waves in a second device, and combine the two resultant waves with each other in a third device.

The apparatus and methods employed in either scheme may of course be extended to any desired number of input waves.

Such methods and arrangements are useful, for example, in systems, commonly called majority systems, in which it is desired that an output wave correspond in polarity to the polarity which is in the majority among the plurality of input waves. (As the term "polarity" is used in the present description, if two waves are in phase they will be regarded as having the same polarity. If they are 180 degrees out of phase, they will be regarded as of opposite polarity.) From majority systems so arranged it is advantageous to derive logical OR and AND systems which further utilize the advantages of devices such as directional couplers and waveguide junctions.

Majority systems of the three-input type or of the five-input type and their derivative systems are particularly useful in logical operations although other numbers of inputs may be employed. Odd numbers of inputs are sometimes preferred, since even numbers of inputs do not necessarily yield majorities. However, it will be seen that by assigning unequal weights to different inputs a majority can be assured in the case of an even number of inputs.

The three-input majority system may be arranged to give a positive output wave when and only when either two or three of the input waves are positive and a negative output wave when and only when none or just one of the input waves is positive. Such a system has various uses, one of which is to compute the carry digit resulting from addition of three binary digits.

In a three-input system, if input waves A and B of substantially equal amplitude are added in the first combining device, the result is positive when both A and B are positive, zero when A and B are of opposite polarities, and negative when A and B are both negative. When the result of this addition is combined with an input wave C of substantially the same amplitude as A or B, as in a second combining device, the various cases give the following final results. When A and B are both positive the final result is positive regardless of the polarity of C. When A and B add up to zero the final result has the same polarity as C. Lastly, when A and B are both negative, the final result is negative regardless of the polarity of C. In each case the polarity of the final result evidently indicates which polarity is in the majority among the three waves A, B and C.

If the system is arranged so that one of the input waves is always positive, then only one of the two remaining input waves need be positive in order that the majority be positive. Hence the system so modified is a two-input OR system, responding with a positive output wave if and only if either one or both of the two variable input waves is positive and with a negative output wave if and only if neither of the variable input waves is positive.

If, on the other hand, the system is arranged so that one of the input waves is always negative, then both of the two remaining input waves must be positive in order that the majority may be positive. Hence this modification of the original system is a two-input AND system, responding with a positive output wave if and only if both of the two variable input waves are positive and with a negative output wave if and only if neither or only one of the input waves is positive.

In a similar manner three-input OR and AND systems may be derived from a five-input majority system. If two of the five inputs are made permanently positive, then among the remaining three inputs only one need be positive in order to make the majority positive. So this modification is a three-input OR system. If, on the other hand, two of the five inputs are made permanently negative, then all three of the remaining inputs must be positive in order to make the majority positive. Hence there is derived a three-input AND system. In either of these arrangements, making two inputs permanently alike essentially reduces the number of inputs in the system to four, one of which has double weighting, so that only three waveguide junctions, directional couplers, or the like, are required.

Other features, objects and advantages will appear from the following more detailed description of an illustrative embodiment of the invention, which will now be given in conjunction with the accompanying drawings.

In the drawings,

FIG. 1 is a tabular representation of some possible logical operations that may be performed in a system with two variable inputs;

FIG. 2 is a tabular representation of some possible logical operations that may be performed in a system with three variable inputs;

FIG. 3 is a perspective view, partly broken away, of a crossguide directional coupler suitable for use in certain embodiments of the invention;

Figure 10:
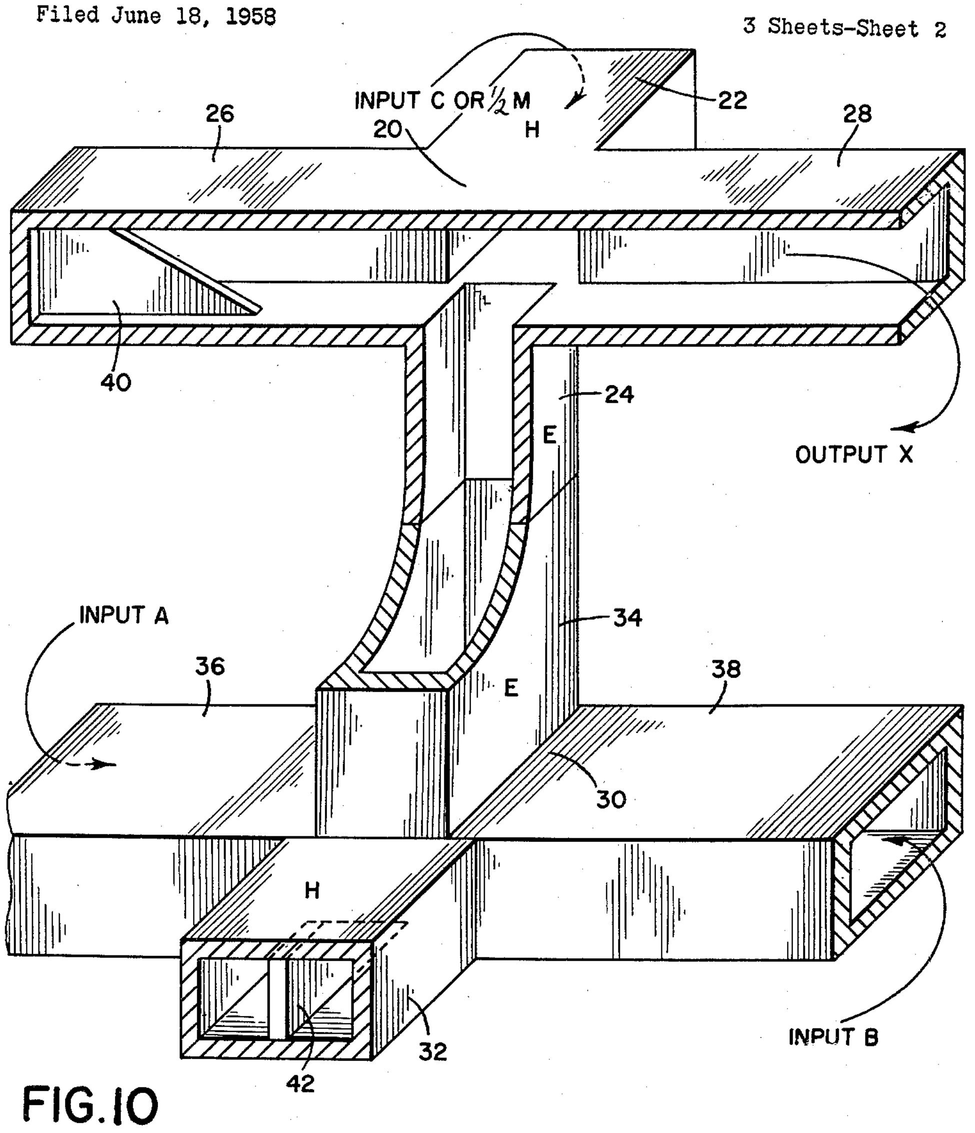
FIG. 10 is a perspective view, partly broken away, of a combination of waveguide junctions embodying the system schown schematically in FIG. 9.
Figure 11:
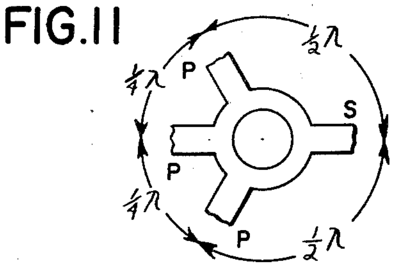
Figure 12:
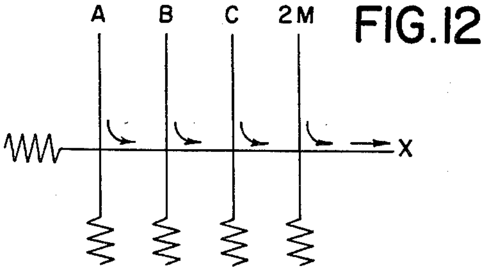
Figure 14:
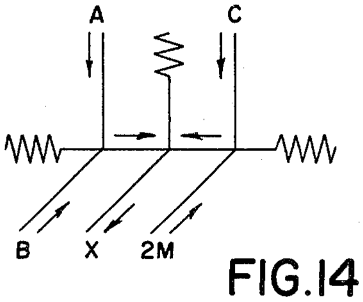
Figure 13:
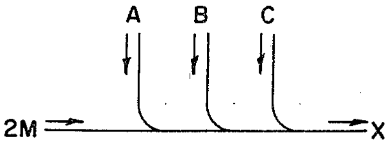

FIG. 11 is a schematic diagram of a form of waveguide junction which may be used in place of the waveguide junctions shown in FIGS. 5 through 10 and FIGS. 12 through 14; of which FIGS. 12 through 14 are schematic diagrams of illustrative systems for carrying out various examples of the logical operations set forth in FIG. 2.

The systems hereinafter described and shown in the drawings employ waves of the type hereinabove described, viz., phase modulated waves whereby, for example, a binary digit "one" is represented by a modulated wave of one phase with reference to a fixed phase standard and a binary digit "zero" is represented by a modulated wave of a phase materially different from the phase of the first-mentioned phase modulated wave, preferably differing from the first by substantially 180 degrees in phase.

Wherever herein the phase of a modulated wave is described or specified it is to be understood that the phase depends upon the time of observation and upon the point in the system at which the phase is observed, and at a given point in the system the phase of a phase modulated wave at any given time is relative to the phases of other phase modulated waves at the same time and at the same point. Furthermore, it will be noted that inversion of phase occurs at points electrically separated from a given point by one-half wavelength, so that a length of waveguide or of coaxial cable or the like having an electrical length of an odd number of half wavelengths serves as an inverter, and may be used as such wherever the logical operation of inversion is required.

Various arrangements of microwave circuit components may be used to mechanize logical operations such as "OR," "AND," "MAJORITY," "BINARY ADDITION," etc. In systems having two input waves either of which may be a phase-modulated wave representing a binary digit one or a binary digit zero and which may have relative amplitude +E or −E, the logical operations OR, AND, and EXCLUSIVE OR may be performed as indicated in tabular form in FIG. 1. For performing the OR operation, the system is so designed that if either one or both of the input voltages A and B respectively are +E thus representing a binary one, the phase of the output wave from the device is positive, and if neither is +E, the phase of the output wave is negative. A system of this sort is indicated in the first line of plus and minus signs in FIG. 1. A positive output is thus obtained whenever either A or B, or both, are positive. In other words, if either A or B represents a binary digit one, the output is a digit one.

For performing the AND operation, the system is designed as indicated in the second line of plus and minus signs in FIG. 1. That is, if both input voltages A and B are +E, then the phase of the output wave is positive, otherwise the phase of the output wave is negative.

For performing the EXCLUSIVE OR operation, the system is designed as indicated in the third line of plus and minus signs in FIG. 1. That is, if one and only one of the input voltages A and B is equal to +E, then the phase of the output wave is positive, otherwise the phase of the output wave is negative.

Each operation has an inverse which is obtained by reversing all the output phases, as by means of an inverter.

It will be noted that in the process of binary addition of two digits, shown in Table 1, the sum may be determined by performing the two-input EXCLUSIVE OR operation upon input waves representing the two digits to be added, and that the resultant carry may be determined by performing the AND operation.

*Table 1*

| A | B | Sum | Carry |
|---|---|---|---|
| 0 | 0 | 0 | 0 |
| 0 | 1 | 1 | 0 |
| 1 | 0 | 1 | 0 |
| 1 | 1 | 0 | 1 |

If a digit 1 is represented by a positive wave and a digit 0 by a negative wave, the table shows that the system for indicating the sum should respond with a positive output wave if and only if just one input wave is positive. That is, the logical operation required to obtain the sum is the EXCLUSIVE OR. The system for obtaining the carry digit should respond with a positive output wave if and only if both inputs are positive. That is, the carry determination requires the AND operation.

FIG. 2 shows some logical operations that may be performed in a system with three input waves in a manner generally similar to the operation of the systems with two input waves given in FIG. 1. Systems using four or more input waves may also be devised.

In FIG. 2, line 1 describes a system for performing the logical OR operation for three inputs, that is, the system is designed to give an output of positive phase if and only if one, two or all three of the inputs are positive. Line 2 describes a MAJORITY system, that is, one which responds with a positive output if and only if two or three of the inputs are positive. Line 3 describes a system for obtaining the binary sum of three digits, without computing the resulting carry. The system gives a positive output if and only if just one or else all three of the inputs are positive. It will be noted from the table of binary addition of three digits, shown in Table 2, that the MAJORITY operation is appropriate to determine the carry digit resulting from the addition and the BINARY SUM operation to determine the resultant sum digit, a digit 1 being represented by a wave of positive phase and a digit 0 by a wave of negative phase.

*Table 2*

| A | B | C | Sum | Carry |
|---|---|---|---|---|
| 1 | 1 | 1 | 1 | 1 |
| 1 | 1 | 0 | 0 | 1 |
| 1 | 0 | 1 | 0 | 1 |
| 0 | 1 | 1 | 0 | 1 |
| 1 | 0 | 0 | 1 | 0 |
| 0 | 1 | 0 | 1 | 0 |
| 0 | 0 | 1 | 1 | 0 |
| 0 | 0 | 0 | 0 | 0 |

In other words, a system that is to produce an output indicative of the sum should respond with an output wave of positive phase when any one or all three of the input waves are of positive phase and should respond with a wave of negative phase when only two or else none of the input waves are of positive phase. Thus the logical operation required to be performed by the system to obtain the sum is that labeled "BINARY SUM" in FIG. 2 and indicated by line 3 of the figure. It will also be seen that a system that is to determine the carry digit resulting from the addition of three binary digits should respond with a positive output wave when any two or all three of the input waves are positive and should respond with a negative output wave when only one or none of the input waves are positive. Thus the logical operation required is that labeled MAJORITY and shown in line 2 of FIG. 2.

Lines 4 through 7 of FIG. 2 indicate other logical systems, of which the system of line 4 responds with a positive output wave if and only if one or two only of the input waves are positive. The system of line 5 performs the logical AND operation for three quantities, that is, it responds with a positive output wave if and only if all three inputs are positive. The system of line 6 responds with a positive output if and only if exactly two of the three inputs are positive. The system of line 7 performs the EXCLUSIVE OR operation, that is, it responds with a positive output if and only if exactly one of the inputs is positive.

FIG. 3 shows a typical crossguide directional coupler which may be used as a phase-sensitive device in certain embodiments of the invention. The figure shows two wave guides 12 and 13 mounted substantially at right angles to each other and having a common wall either of single or double thickness at the junction. Coupling between the wave guides is provided by means of a hole 14 in the common wall. This hole is displaced, with respect to the center of the intersection, in the direction toward the top of this figure, to give the coupling a directional property. One or more arms of the device may be terminated by means of a directionally selective resistance strip 15 positioned at an end wall 16. In the operation of the device shown in FIG. 3, input waves, for example waves A and M may be impressed upon open ends of the component wave guides and an output wave may be obtained at another open end as indicated at X.

Figure 4:
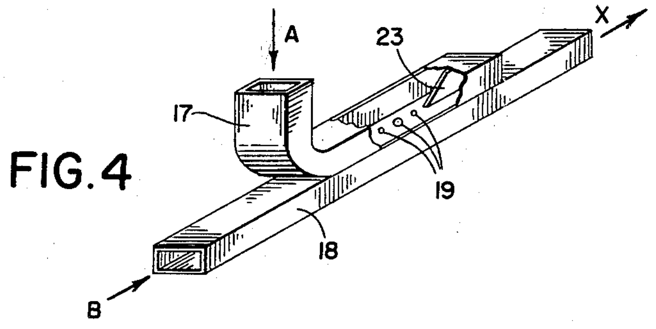
FIG. 4 is a perspective view, partly broken away, of a multi-hole directional coupler which is also suitable for such use.

FIG. 4 shows a typical multi-hole directional coupler which may be used as another form of a phase-sensitive device. This figure shows two wave guides 17 and 18 mounted parallel to each other and having a common wall either of single or double thickness over a region in which the wave guides overlap. Coupling between the wave guides is provided by a plurality of holes 19 in the common wall. The holes may be of graduated diameters. A terminating resistance strip may be provided as at 23. In the operation of the device shown in FIG. 4, input waves may be applied as at A and B and an output wave obtained as at X.

Figure 5:
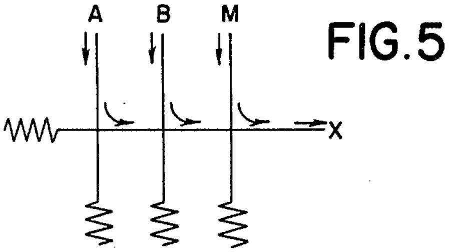
FIGS. 5 through 9 are schematic diagrams of illustrative systems for carrying out various examples of the logical operations set forth in FIGS. 1 and 2.
Figure 6:
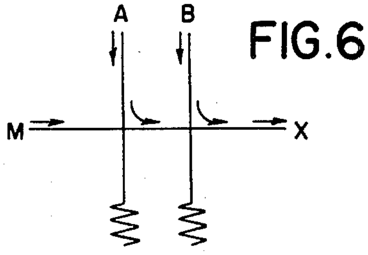
Figure 7:
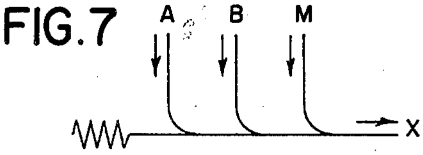

Illustrative combinations of crossguide directional couplers are utilized in the systems shown in FIGS. 5, 6 and 12, and illustrative combinations of multi-hole directional couplers are utilized in the systems shown in FIGS. 7 and 13.

The three-input MAJORITY system is the basis for the two-input OR and AND systems and so will be the first described herein. Any of the systems of FIGS. 5 through 10 will function as a MAJORITY circuit provided input waves A and B are supplied as shown and a third variable input wave C is supplied where an input wave M is indicated in the drawings. Each of these same systems will function as an OR system when an input wave of fixed positive phase is supplied as the input wave M. Furthermore each of these systems will function as an AND system when an input wave of fixed negative phase is supplied as the input wave M.

In FIG. 5, the cross arms of three crossguide directional couplers are shown diagrammatically connected together so that power flows in the same direction in all the cross arms. The first cross arm is terminated on one end by a matched load indicated diagrammatically. The input waves A, B and M are applied as shown and are so phased that each contributes a voltage of +E or a —E as measured at the output X. If the contribution of A, B and M are each of voltage +E, as measured at X, the sum +3E appears at X. If either A or B is +E, and the other is —E, the sum is +E. If neither A nor B is +E, the sum is —E. Thus it may be seen that the output wave is positive whenever A or B or both are positive. Due to the directional property of the couplers, waves entering the couplers are not reflected back to the sources of the waves A, B or M, but reflected waves if any are diverted to the non-reflective terminations connected to various arms.

In general, the energy supplied by the source of input wave A divides, some going into the cross arm to contribute to the output wave and the remainder continuing on in the main wave guide. The latter portion of the energy may be utilized elsewhere for any desired purpose, in which case the non-reflective termination shown in the main wave guide is not needed. The other input waves may be utilized in similar manner.

FIG. 6 shows how one of the crossguide directional couplers of FIG. 5 may be omitted and the input wave M, for example, may be applied to the cross arm of one of the couplers in place of the matched termination shown therefor in FIG. 5, with the same over-all result as in the arrangement of FIG. 5. In this case the amplitudes and phases of the input waves are to be readjusted as may be required so that M, A and B will contribute equal amplitudes (of the proper phase) as measured at X.

FIG. 7 shows how multi-hole directional couplers may be used in place of the crossguide directional couplers shown in FIG. 5.

Figure 8:
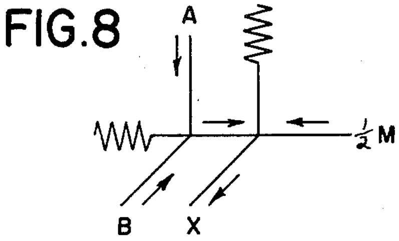
Figure 9:
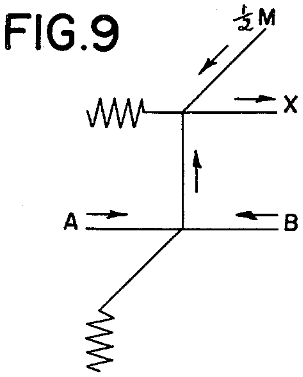

FIGS. 8 and 9 show how the type of waveguide T junction commonly called a magic-T may be used with the same over-all result as in the arrangement of FIG. 5, the systems of FIGS. 8 and 9 employing two magic-T's each. In the figures showing magic-T's in diagrammatic fashion the H-arm in each magic-T is indicated by a line at an angle of 45 degrees to the horizontal, and the E-arm is indicated by a vertical line. The cross arms are indicated by horizontal lines.

In the system of FIG. 8, the input waves A and B are applied to the E-arm and the H-arm respectively of the first magic-T. One side arm of this magic-T may, if desired, be terminated in a non-reflective impedance such as a resistance strip and the other side arm is connected to one side arm of the second magic-T. An input wave ½M is applied to the remaining side arm of the second magic-T. The E-arm of this magic-T also may, if desired, be connected to a non-reflective termination, and the H-arm delivers the output wave. Impedance matching devices such as, for example, tuning rods, may be added to the magic-T in conventional manner. It is not necessary, however, to employ impedance matching in the magic-T's, nor even to use a junction having four arms. In many cases ordinary T-junctions with three arms each may be used. Reaction of reflected waves upon the wave sources may be reduced or prevented if desired by interposing isolators, for example ferrite isolators, or attenuators, between the sources and the T-junctions. When ordinary T-junctions are used, the non-reflective terminations shown in FIG. 8 are not needed.

For convenience a convention may be established with regard to the figures showing wave guide junctions of the magic-T type whereby the H-arm and the side arms will all be regarded as having the E-vector in the vertical orientation. The E-arm will be regarded as having the E-vector in the horizontal orientation.

The magnitude of the E-vector will be given in terms of the unit magnitude designated by E.

The sense of the E-vector of an output wave will be regarded as positive if the E-vector is upwardly directed when vertically oriented or directed to the right when horizontally oriented, and as negative if downwardly directed or directed to the left. The sense of the E-vector of an input wave on the other hand will be chosen as the case may require to insure that an input wave having a positive E-vector contributes a positive component to the E-vector of the output wave. The amplitude of each input wave will be so chosen that the input wave contributes an amplitude component of E to the output wave.

It will be understood that the directions mentioned above are applicable to conditions as they exist at a given illustrative instant of time.

In the operation of the system of FIG. 8, an input voltage of +4E at A divides in the first magic-T giving −2E in the matched termination and +2E in the common side arm leading to the second magic-T. This input of +2E into one side arm of the second magic-T divides, giving −E in the matched termination and +E in the output wave X. Similarly, an input voltage of −4E at A divides in the first magic-T giving +2E in the matched termination and −2E in the common side arm leading to the second magic-T. This input of −2E into the second magic-T divides, giving +E in the matched termination and −E in the output wave X.

On the other hand, an input voltage of +4E at B divides in the first magic-T giving +2E in the matched termination and +2E input into the second magic-T, which input divides again, giving −E in the matched termination and +E in the output wave X. Reversing the input phase at B gives −2E in the matched termination of the first magic-T, −2E input into the second magic-T, +E into the matched termination of the second magic-T, and −E in the output wave X.

When A and B are both positive, the contribution of A and B in the output wave X is +E from A and +E from B, making a total of +2E.

When A is positive and B is negative, the contribution of A and B in the output wave X is +E from A and −E from B, making a total of zero.

When A is negative and B is positive, the contributions are −E from A and +E from B, again making a total of zero.

When A and B are both negative, the contributions are −E from A and −E from B, making a total of −2E.

To make the system of FIG. 8 operate as a MAJORITY circuit for three arbitrary input waves, A, B and C, the input M is replaced by the input C which may be either +4E or −4E. Thus, ½C applied to the second magic-T in the system of FIG. 8 gives an input voltage of +2E which divides, giving +E in the matched termination of the second magic-T and +E in the output wave X when C is +4E, or gives an input voltage of −2E which divides, giving −E in the matched termination of the second magic-T and −E in the output wave X when C is −4E.

When A and B are both positive, their contribution to the output wave as shown hereinabove is +2E, which together with a contribution of ±E from C gives an output voltage of either +3E or +E.

When A is positive and B is negative, or vice versa, their contribution to the output wave has been shown to be zero, which together with a contribution of +E from C gives an output voltage of +E. On the other hand, with a contribution of −E from C the output voltage is −E.

When A and B are both negative, their contribution to the output wave has been shown to be −2E. This together with +E from C gives an output voltage of −E. On the other hand, with a contribution of −E from C the output voltage is −3E.

In summary, in the system of FIG. 8 operated as a MAJORITY circuit, the output voltage is 3E, E, −E, or −3E, according to whether three, two, one or none, respectively, of the inputs A, B, C are positive, as is required by the rule of majority, so that for a majority of positive inputs the output voltage is positive and for a majority of negative inputs the output voltage is negative.

To make the system of FIG. 8 operate as an OR circuit, the voltage M is made of fixed phase and is required to be of amplitude +4E. Thus, ½M applied to the second magic-T as shown gives an input voltage of +2E which divides, giving +E in the matched termination of the second magic-T and +E in the output wave X.

When A and B are both positive, the result has been shown to be +2E contributed to the output wave X. This contribution together with +E from ½M gives an output wave voltage of +3E.

When A is positive and B is negative, the result has been shown to be zero input from A and B into the second magic-T. The only contribution to the output wave is then the +E contributed by ½M, so the output voltage at X is +E.

When A is negative and B is positive, the result has been shown to be zero input from A and B into the second magic-T, again giving +E as the total voltage of the output wave at X.

When A and B are both negative, the result has been shown to be −2E contributed to the output wave. The contribution together with +E from the ½M gives a total output voltage −E in the output wave at X.

Comparison of the results in the four cases shows that the output voltage at X is positive if either one or both of the inputs A and B are positive and that the output voltage at X is negative if neither input is positive. Thus the system of FIG. 8 is shown to perform the logical OR operation.

It will be noted that, regardless of the phases of A and B, substantially the entire power output of the sources of the waves A and B is delivered either to the non-reflective load in one side arm of the first magic-T or is passed on to the second magic-T. In the second magic-T the power if and when received from the first magic-T is substantially equally divided between the non-reflective load in the E-arm and the output circuit in the H-arm. Substantially no power from waves A or B reaches the side arm containing the source of the third input wave. Furthermore, the third source sends power in substantially equal amounts to the E-arm and H-arm, respectively, of the second magic-T. Thus the source of the third input wave has no material effect upon the sources of waves A and B. Consequently, the phases of all three waves may be varied in any manner without causing any material change in the load conditions faced by the sources of waves A and B.

While the power inputs into the respective side arms of the second magic-T are not matched as are the input waves A and B in the first magic-T, the load conditions are substantially similar for the source of the third input wave under all variations of the input phases, since the input of A and B into the second magic-T is either zero or ±4E while the input from the third source is always +2E. Thus the difference of the input voltages on the two side arms is substantially the same under all conditions.

In the system of FIG. 9, the input waves A and B are applied to the side arms respectively of the lower magic-T. The H-arm has a matched termination and the E-arm is connected to the E-arm of the upper magic-T. The third input wave is applied to the H-arm of the upper magic-T. One side arm of the upper magic-T has a matched termination and the remaining side arm delivers the output wave X.

In the operation of the system of FIG. 9, an input voltage of +4E at A divides in the lower magic-T giving +2E in the matched termination and −2E input into the upper magic-T. This input divides again in the upper magic-T, giving −E in the matched termination in the upper magic-T and +E contribution to the output wave X. Similarly, an input voltage of −4E at A divides in the lower magic-T, giving −2E in the matched termination and +2E input into the upper magic-T. This input gives +E in the matched termination in the upper magic-T and −E contribution to the output wave X.

An input voltage of +4E at B (which in this case should be downwardly directed) divides in the lower magic-T and gives −2E in the matched termination and −2E input into the upper magic-T. Since the inputs from A and B into the upper magic-T are the same, the result in the upper magic-T is the same for A and B, viz., −E in the matched termination and +E contribution to the output wave X. Similarly, an input voltage of −4E at B gives +2E in the matched termination in the lower magic-T and +2E input into the upper magic-T. The result in the upper magic-T is +E in the matched termination and −E contribution to the output wave X.

To make the system of FIG. 9 operate as a MAJORITY system, a third variable input wave C is substituted for wave M. The operation is similar to that described above in connection with the system of FIG. 8.

To make the system of FIG. 9 operate as an OR circuit, the voltage M is again required to be +4E. Thus ½M applied to the upper magic-T as shown gives an input voltage of +2E which divides, giving +E in the matched termination of the upper magic-T and +E in the output wave X.

When A and B are both positive, the result is zero voltage in the matched termination and −4E input into the upper magic-T. In the upper magic-T, the result is −2E in the matched termination and +2E contribution to the output wave. This contribution together with +E from the ½M gives an output voltage of +3E at X.

It will be readily seen that this case and the other three cases work out to give the same over-all results as were found for the system of FIG. 8, in which the logical OR operation is performed.

Similarly to the case of the system of FIG. 8, regardless of the phases of A and B, the entire power output of the sources of the waves A and B is delivered either to the non-reflective load in the H-arm of the first magic-T or is passed on to the second magic-T. In the second magic-T the power if and when received from the first magic-T is substantially equally divided between the side arms, one containing a non-reflective load and the other being the output circuit. The third source sends power in substantially equal amounts to the respective side arms of the second magic-T. Substantially uniform loading conditions on the wave sources are again provided as in the case of the system of FIG. 8.

FIG. 10 is a perspective view, partly broken away, of an illustrative embodiment of the system shown diagrammatically in FIG. 9. In FIG. 10, a wave guide hybrid junction or T junction, commonly called a "magic-T" is shown at 20 and has an H-arm 22, an E-arm 24 and side arms 26, 28. For clarity, the arms 22, 24 are labeled "H" and "E," respectively. A second, similar magic-T 30 is shown with H-arm 32, E-arm 34 and side arms 36, 38. The E-arms of the respective magic-T's are joined together as shown. The side arm 26 of magic-T 20 and the H-arm 32 of magic-T 30 are terminated in non-reflective resistance strips 40 and 42, respectively.

In the operation of the system of FIG. 10, an input wave A is impressed upon the side arm 36 of magic-T 30 and an input wave B is impressed upon the side arm 38. A third input wave ½M is impressed upon the H-arm 22 of magic-T 20. The output wave X is obtained from the side arm 28 of magic-T 20. The detailed operation of the system is as explained hereinabove in connection with the system of FIG. 9.

There are other combinations and arrangements of magic-Ts or directional couplers or both which will produce results similar to those obtainable with the systems of FIGS. 8 and 9. Furthermore, forms of wave guide hybrid junctions other than the magic-T, as for example, the hybrid ring shown diagrammatically in FIG. 11, in which the letters S and P designate series and parallel connections respectively, may be used as four-terminal devices in place of the magic-T's shown in the drawings or in alternative forms of systems.

The systems of FIGS. 5 through 10 can be altered to perform the logical AND operation instead of the logical OR, simply by substituting −M for M, that is, by reversing the phase of the M-wave in each instance.

In the operation of the system of FIG. 5 as an AND circuit, if A and B are both positive, the output voltage is made up of +E from A, +E from B, and −E from −M, a sum of +E. If A and B are of opposite phases, the sum of their contributions to the total is zero, leaving the output voltage of −E from the −M input alone. If both A and B are negative, the output voltage is −3E. Thus, if A and B are both positive the output is positive. Otherwise, the output is negative. Therefore the logical AND operation is performed by the system of FIG. 5 when −M is applied in place of M.

The operation of modified systems of FIGS. 6 and 7 will now be readily understood in view of the description of the modified operation of the system of FIG. 5.

To understand the operation of the modified system of FIG. 8 in the logical AND type of operation, it is only necessary to examine what happens to the output wave voltage in the second magic-T. Here, when A and B are both positive, the contribution of the combination of A and B to the output wave is +2E. This contribution together with what is now −E from the input wave of fixed phase gives an output voltage of +E. When A and B are of opposite phases to each other, their combination contributes zero to the output voltage wave, so that the output voltage wave is −E. When both A and B are negative, the contribution of the combination of A and B to the output wave is −2E and the output voltage wave is −3E. Thus, the output voltage wave is positive only if A and B are both positive, as required in the logical AND operation.

The operation of the system of FIG. 9 as an AND circuit will now be clear from the description of the modified system of FIG. 8.

FIGS. 12, 13 and 14 show three-input OR circuits which are extended applications of the principles underlying the two-input OR circuits shown in FIGS. 5 through 10 and will readily be understood from the explanations hereinabove given for the latter circuits. It will be noted that in the systems of FIGS. 12, 13 and 14 the input wave of fixed phase now has a weighted value 2M. The result is that if the variable input waves A, B and C include either one, two or three waves of positive phase, the sum of A plus B plus C plus 2M is positive and if all of the variable inputs are negative then the sum is negative. Thus the output phase is positive whenever one or more of the input phases are positive, as required for a logical OR operation.

Each of the systems of FIGS. 12, 13 or 14 may be operated as a three-input AND circuit by merely substituting —M in place of +M in each instance.

The systems of FIGS. 12, 13 and 14 are based upon five-input majority systems in which two of the inputs are of fixed phase and are equal to each other in phase and amplitude. Therefore the two fixed inputs may be combined in a single input 2M as shown.

FIG. 14 shows how three wave guide junctions suffice to combine four input waves, by combining one pair of the waves, e.g., A and B, in a first junction, the other pair, e.g., C and 2M, in a second junction, and combining the output waves from the first and second junctions as input waves in the third (middle) junction, so that the output wave from the third junction indicates the final result of combining the four input waves.

Where an odd number is mentioned, as in the claims or elsewhere, it is to be understood that the number "one" is an odd number.

While illustrative forms of apparatus and methods in accordance with the invention have been described and shown herein, it will be understood that numerous changes may be made without departing from the general principles and scope of the invention.

What is claimed is:

1. A majority circuit for three input waves A, B and C, each of which waves is phase-modulated in one or the other of two substantially opposite phases, which circuit comprises two phase-sensitive wave-combining devices each having at least three arms, means connecting an arm of a first said wave-combining device to an arm of a second said wave-combining device, means for impressing input waves A and B respectively upon two remaining arms of said first wave-combining device, and means for impressing an input wave C upon a first remaining arm of said second wave-combining device.

2. An OR circuit for two input waves each of which is phase-modulated in one or the other of two substantially opposite phases, which circuit comprises two phase-sensitive wave-combining devices each having at least three arms, means connecting an arm of a first said wave-combining device to an arm of a second said wave-combining device, means for impressing input waves A and B, respectively, of said type upon two remaining arms of said first wave-combining device, and means for impressing upon a remaining arm of said second wave-combining device an input wave C of said type which is phase-modulated in a fixed phase, the said fixed phase being the same phase to which the said OR circuit is designed to respond.

3. An AND circuit for two input waves each of which is phase-modulated in one or the other of two substantially opposite phases, which circuit comprises two phase-sensitive wave-combining devices each having at least three arms, means connecting an arm of a first said wave-combining device to an arm of a second said wave-combining device, means for impressing input waves A and B, respectively, of said type upon two remaining arms of said first wave-combining device, and means for impressing upon a remaining arm of said second wave-combining device an input wave C of said type which is phase-modulated in a fixed phase, the said phase being opposite to the phase to which the said AND circuit is designed to respond.

4. A majority circuit for three input waves each of which is phase-modulated in one or the other of two substantially opposite phases, which circuit comprises two magic-T's each having an E-arm, and H-arm and two side arms, one side arm of one said magic-T being connected to one side arm of the other magic-T, means for impressing upon the E-arm of a first of said magic-T's an input wave A, means for impressing upon the H-arm of said first magic-T an input wave B, and means for impressing upon the remaining free side arm of the second said magic-T an input wave C, whereby the phase of an output wave X in the H-arm of the said second magic-T is controlled by the majority of the phases of the three said input waves.

5. A majority circuit for three input waves each of which is phase-modulated in one or the other of two substantially opposite phases, which circuit comprises two magic-T's each having an E-arm, an H-arm and two side arms, one side arm of one said magic-T being connected to one side arm of the other said magic-T, means for impressing upon the E-arm of a first of said magic-T's an input wave A, means for impressing upon the H-arm of said first magic-T an input wave B, of amplitude substantially equal to the amplitude of the said input wave A, and means for impressing upon the remaining free side arm of the second said magic-T an input wave C of substantially one-half the amplitude of the said input wave A, whereby the phase of an output wave X in the H-arm of the said second magic-T is controlled by the majority of the phases of the three said input waves A, B and C.

6. An OR circuit for two input waves each of which is phase-modulated in one or the other of two substantially opposite phases, which circuit comprises two magic-T's each having an E-arm, an H-arm and two side arms, one side arm of one said magic-T being connected to one side arm of the other said magic-T, means for impressing upon the E-arm of a first of said magic-T's an input wave A, means for impressing upon the H-arm of said first magic-T an input wave B of amplitude substantially equal to the amplitude of the said input wave A, and means for impressing upon the remaining free side arm of the second said magic-T an input wave of fixed phase and of substantially one-half the amplitude of the said input wave A, said input wave of fixed phase being of like phase with respect to a wave of the phase to which the OR circuit is designed to respond.

7. An AND circuit for two input waves each of which is phase-modulated in one or the other of two substantially opposite phases, which circuit comprises two magic-T's each having an E-arm, an H-arm and two side arms; one side arm of one said magic-T being connected to one side arm of the other said magic-T, means for impressing upon the E-arm of a first of said magic-T's an input wave A, means for impressing upon the H-arm of said first magic-T an input wave B of amplitude substantially equal to the amplitude of the said input wave A, and means for impressing upon the remaining free side arm of the second said magic-T an input wave of fixed phase and of substantially one-half the amplitude of the said input wave A, said input wave of fixed phase being of opposite phase to a wave of the phase to which the AND circuit is designed to respond.

8. An OR circuit comprising two independent wave sources A and B of equal frequency and substantially equal amplitude, each said source being phase-modulated in one or the other of two substantially opposite phases, two magic-T's each having an E-arm, and H-arm and two side arms; the E-arms of the two magic-T's being connected together, means for impressing upon one side arm of a first of said magic-T's an input wave from said source A, means for impressing upon the other side arm of said first magic-T an input wave from said source B, and means for impressing upon the H-arm of the second said magic-T an input wave of fixed phase and of substantially one-half the amplitude of the said input wave A, said input wave of fixed phase being of like phase with respect to a wave of the phase to which the OR circuit is designed to respond.

9. An AND circuit comprising two independent wave sources A and B of equal frequency and substantially equal amplitude, each said source being phase-modulated in one or the other of two substantially opposite phases, two magic-T's each having an E-arm, an H-arm and two side arms; the E-arms of the two magic-T's being connected together, means for impressing upon one side arm of a first of said magic-T's an input wave from said source A, means for impressing upon the other side arm of said first magic-T an input wave from said source B, and means for impressing upon the H-arm of the second said magic-T an input wave of fixed phase and of substantially one-half the amplitude of the said input wave A, said input wave of fixed phase being of opposite phase to a wave of the phase to which the AND circuit is designed to respond.

10. A majority circuit comprising three independent wave sources A, B and C, of equal frequency and substantially equal amplitude, each said source being phase-modulated in one or the other of two substantially opposite phases, two wave guide junctions each of which junctions has at least three arms, one arm of one said junction being connected to one arm of the other said junction, means for impressing upon a second arm of a first of said junctions an input wave from source A, means for impressing upon a third arm of the said first junction an input wave from source B, and means for impressing upon a second arm of the other said junction an input wave from source C, a remaining arm of said second junction constituting an output arm for delivering an output wave which is either substantially in phase with or substantially opposite in phase to the wave supplied by a particular one of said sources, according to whether or not the majority of the waves from sources A, B and C are in phase with the wave from said particular source.

11. A majority circuit comprising three independent wave sources A, B and C, of equal frequency and substantially equal amplitude, each said source being phase-modulated in one or the other of two substantially opposite phases, two magic-T's each having an E-arm, an H-arm and two side arms; the E-arms of the two magic-T's being connected together, means for impressing waves from said source A upon one side arm of a first of said magic-T's, means for impressing waves from said source B upon the other side arm of said first magic-T, and means for impressing upon the H-arm of the second said magic-T waves from said source C of substantially one-half the amplitude of the said input wave A, a remaining free side arm of the said second magic-T constituting an output arm for delivering an output wave which is either substantially in phase with or substantially opposite in phase to the wave supplied by said source A, according to whether or not the majority of the waves from sources A, B and C are in phase with the wave from source A.

12. A majority circuit for input waves A, B and C of equal frequency, each of which waves is phase-modulated independently of the other said input waves in one or the other of two substantially opposite phases, which circuit comprises first and second phase-sensitive wave-combining devices each adapted for combining two input waves of the type of said input waves A, B and C to produce an output wave of amplitude determined substantially by the sum or difference of the amplitudes of the said combining waves according to the relative phases of the said combining waves, means to impress input waves A and B upon said first phase-sensitive wave-combining device, means connecting the output of said first phase-sensitive wave-combining device to the input of said second phase-sensitive wave-combining device, means to impress input wave C upon said second phase-sensitive wave-combining device in conjunction with said output wave from said first phase-sensitive wave-combining device in an amplitude intermediate between the respective said sum and difference amplitudes of the said output wave as the latter is impressed upon the input of said second phase-sensitive wave-combining device, to produce in said second phase-sensitive wave-combining device a second output wave of amplitude determined substantially by the sum or difference of the amplitudes of the said impressed input wave C and the said first output wave so impressed, and of phase agreeing with the phase of the wave of the larger amplitude of the said two waves so impressed, whereby the said second output wave is controlled in phase by the majority phase among the said input waves A, B and C.

13. Apparatus according to claim 12, in which the said means to impress input waves A and B upon said first phase-sensitive wave-combining device is adapted to impress said waves in substantially equal amplitude, and the said means to impress input wave C upon said second phase-sensitive wave-combining device is adapted to impress said wave in substantially one-half the maximum impressed amplitude of the said first output wave.

References Cited in the file of this patent

UNITED STATES PATENTS

| | | |
|---|---|---|
| 2,704,351 | Dicke | Mar. 15, 1955 |
| 2,801,391 | Whitehead | July 30, 1957 |
| 2,830,288 | Dicke | Apr. 8, 1958 |
| 2,914,249 | Goodall | Nov. 24, 1959 |
| 2,987,630 | Schreiner | June 6, 1961 |